US009706478B2

United States Patent
Mitsui et al.

(10) Patent No.: US 9,706,478 B2
(45) Date of Patent: Jul. 11, 2017

(54) BASE STATION AND APPARATUS

(71) Applicant: KYOCERA CORPORATION, Kyoto (JP)

(72) Inventors: Katsuhiro Mitsui, Kawasaki (JP); Masato Fujishiro, Yokohama (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/253,533

(22) Filed: Aug. 31, 2016

(65) Prior Publication Data
US 2017/0006523 A1 Jan. 5, 2017

Related U.S. Application Data

(63) Continuation of application No. PCT/JP2015/081211, filed on Nov. 5, 2015.

(30) Foreign Application Priority Data

Nov. 7, 2014 (JP) .................................. 2014-227440

(51) Int. Cl.
H04W 48/08 (2009.01)
H04W 36/14 (2009.01)
H04W 48/18 (2009.01)
H04W 48/20 (2009.01)
H04W 84/12 (2009.01)

(52) U.S. Cl.
CPC .......... H04W 48/08 (2013.01); H04W 36/14 (2013.01); H04W 48/18 (2013.01); H04W 48/20 (2013.01); H04W 84/12 (2013.01)

(58) Field of Classification Search
CPC ...... H04W 48/08; H04W 84/12; H04W 48/20
See application file for complete search history.

(56) References Cited

U.S. PATENT DOCUMENTS 7,362,742 B1 * 4/2008 Siddiqi ................... H04L 45/00
  370/350
9,392,461 B2 * 7/2016 Huber ................ G06Q 20/1235
2007/0079376 A1 * 4/2007 Robert ................ H04L 63/1408
  726/23

(Continued)

FOREIGN PATENT DOCUMENTS

JP        2013-522986 A    6/2013

OTHER PUBLICATIONS

International Search Report issued in PCT/JP2015/081211; mailed Jan. 19, 2016.

(Continued)

Primary Examiner — Brian D Nguyen
(74) Attorney, Agent, or Firm — Studebaker & Brackett PC

(57) ABSTRACT

A base station according to an embodiment comprises: a controller including a memory. The controller is configured to store a list in the memory, the list including at least one or more identifiers of Wireless Local Area Network (WLAN) access points. The controller is further configured to execute a process of receiving first information from a node configured to connect to the WLAN access points. The first information includes at least one ore more identifiers of WLAN access points to be deleted from the list. The controller is further configured to update the list on a basis of the first information.

5 Claims, 5 Drawing Sheets

(56) References Cited

U.S. PATENT DOCUMENTS

| | | | | |
|---|---|---|---|---|
| 2008/0261015 A1* | 10/2008 | Okajima | ................. | B60J 10/32 |
| | | | | 428/304.4 |
| 2009/0290493 A1* | 11/2009 | Xu | ....................... | H04W 28/08 |
| | | | | 370/237 |
| 2011/0222523 A1 | 9/2011 | Fu et al. | | |
| 2012/0315905 A1* | 12/2012 | Zhu | ...................... | H04W 36/36 |
| | | | | 455/436 |
| 2015/0245280 A1* | 8/2015 | Zhou | .................... | H04W 36/32 |
| | | | | 455/434 |

OTHER PUBLICATIONS

Written Opinion issued in PCT/JP2015/081211; mailed Jan. 19, 2016.

3rd Generation Partnership Project; Technical Specification Group Radio Access Network; Evolved Universal Terrestrial Radio Access (E-UTRA); User Equipment (UE) procedures in idle mode; 3GPP TS 36.304; V12.2.0; Sep. 2014; pp. 1-37; Release 12; 3GPP Organizational Partners.

JP Office Action dated Jan. 17, 2017 from corresponding JP Appl No. 2016-554906, with concise statement of relevance, 4 pp.

\* cited by examiner

BASE STATION AND APPARATUS

RELATED APPLICATIONS

This application is a continuation application of international application PCT/JP2015/081211, filed Nov. 5, 2015, which claims benefit of JP Patent Application 2014-227440, filed Nov. 7, 2014, the entirety of all applications hereby expressly incorporated by reference.

TECHNICAL FIELD

The present application relates to a base station and a wireless LAN access point, used in a system in which a switching process of switching a standby target or a connection target between a coverage area of a mobile communication network and a coverage area of a wireless LAN is executed.

BACKGROUND ART

Conventionally, there is proposed a switching process (a network selection and a traffic steering) of switching, by a radio terminal, a standby target or a connection target between a mobile communication network and a wireless LAN when a coverage area of the mobile communication network represented by LTE (Long Term Evolution) and a coverage area of the wireless LAN overlap at least partially (see Non Patent Literature 1, for example).

Specifically, the switching process is executed on the basis of the radio terminal determining whether or not first information at a mobile communication network side satisfies a first condition, and the radio terminal determining whether or not second information at a wireless LAN side satisfies a second condition. The first information and the second information (hereinafter, a "determination parameter") used by the radio terminal for determination of the switching process are notified from the base station arranged in the mobile communication network to the radio terminal.

It is noted that the base station notifies the radio terminal of a list of AP identifiers (hereinafter, "AP list") indicating a wireless LAN access point that is a candidate standby target or connection target. The radio terminal selects, on the basis of the AP list notified from the base station, the wireless LAN access point of the standby target or the connection target.

PRIOR ART DOCUMENT

Non-Patent Document

Non Patent Document 1: 3GPP Technical Specification "TS 36.304 V12.2.0" Sep. 23, 2014

SUMMARY

A base station according to an embodiment comprises: a controller including a memory. The controller is configured to store a list in the memory, the list including at least one or more identifiers of Wireless Local Area Network (WLAN) access points. The controller is further configured to execute a process of receiving first information from a node configured to connect to the WLAN access points. The first information includes at least one or more identifiers of WLAN access points to be deleted from the list. The controller is further configured to update the list on a basis of the first information.

An apparatus for a base station according to an embodiment comprises: a processor and a memory. The processor is configured to cause the base station to store a list in the memory, the list including at least one or more identifiers of Wireless Local Area Network (WLAN) access points, and receive first information from a node configured to connect to the WLAN access points. The first information includes at least one or more identifiers of WLAN access points to be deleted from the list. The processor is further configured to cause the base station to update the list on a basis of the first information.

DESCRIPTION OF EMBODIMENTS

Overview of Embodiment

Figure 1:
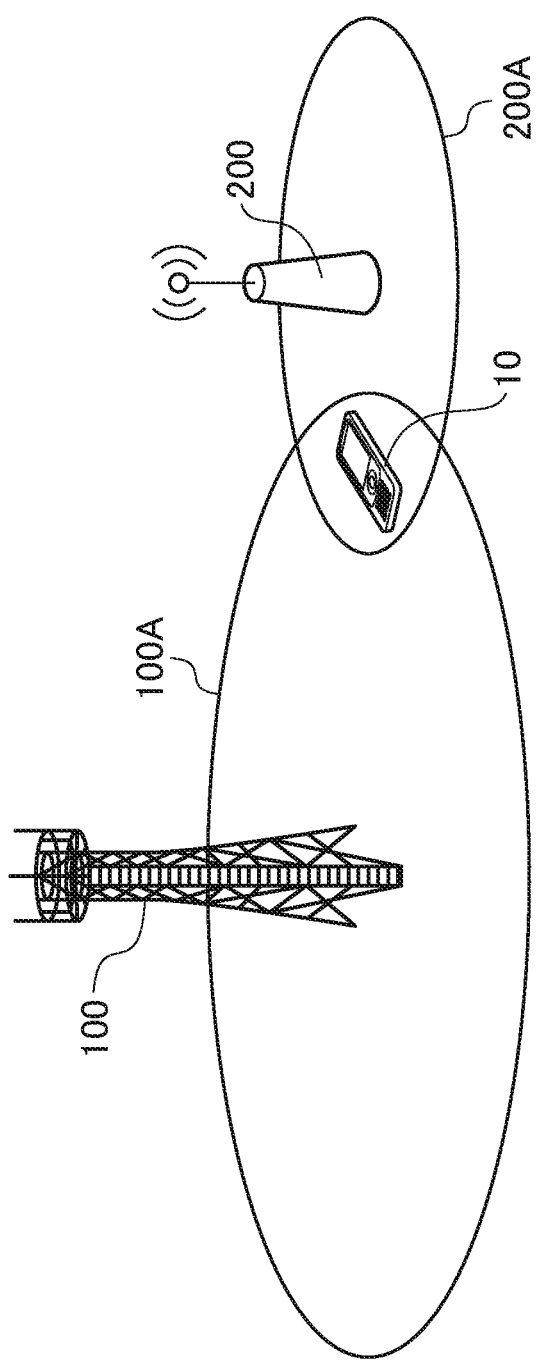
FIG. 1 is a diagram showing a communication system 1 according to each embodiment.

A base station according to an embodiment comprises: a controller including a memory. The controller is configured to store a list in the memory, the list including at least one or more identifiers of Wireless Local Area Network (WLAN) access points. The controller is further configured to execute a process of receiving first information from a node configured to connect to the WLAN access points. The first information includes at least one or more identifiers of WLAN access points to be deleted from the list. The controller is further configured to update the list on a basis of the first information.

The controller may be configured to execute a process of transmitting a list based on the updated list.

The controller may be configured to execute a process of sending a response to the first information, to the node.

The controller may be configured to execute a process of sending a response to the first information to the node if the controller refuses updating based on the first information. The response indicates that the controller refuses the updating based on the first information.

The controller may be configured to execute a process of receiving second information. The second information may include at least one or more identifiers of a WLAN access points to be added to the list.

An apparatus for a base station according to an embodiment comprises: a processor and a memory. The processor is configured to cause the base station to store a list in the memory, the list including at least one or more identifiers of Wireless Local Area Network (WLAN) access points, and receive first information from a node configured to connect to the WLAN access points. The first information includes at least one or more identifiers of WLAN access points to be deleted from the list. The processor is further configured to cause the base station to update the list on a basis of the first information.

A radio terminal that performs standby or connection in a mobile communication network autonomously executes a determination for switching to a wireless LAN on the basis of a determination parameter, without receiving a direct instruction from a base station. Thus, even when a base station or a wireless LAN access point does not wish the switching process to the wireless LAN, the radio terminal may send a connection request to a wireless LAN access point in an AP list according to the determination.

In this case, due to a refusal of the connection request by the wireless LAN access point, the connection request by the radio terminal may be wasted and the switching process from the wireless LAN to the mobile communication network may occur immediately.

A base station according to a first embodiment (and another embodiment) is a base station configured to constitute a mobile communication network. The base station comprises: a transmitter configured to transmit first information to a radio terminal controlled by the base station itself, the first information including one or more identifiers indicating a wireless LAN access point that is a candidate of a standby target or a connection target when a radio terminal switches the standby target or the connection target from the mobile communication network to a wireless LAN; and a receiver configured to receive a removal request for removing at least one or more predetermined identifiers from the first information, from the wireless LAN access point or a node configured to control the wireless LAN access point.

In the first embodiment, the removal request includes the predetermined identifiers.

The base station according to the first embodiment further comprises: a controller configured to remove, in response to the removal request, the predetermined identifiers from the first information.

In the first embodiment, the controller controls to transmit, when not removing the predetermined identifiers from the first information, a response with an indication that the predetermined identifiers are not removed, to the wireless LAN access point or the node from which the removal request is transmitted.

In the first embodiment, the transmitter transmits the first information in which the predetermined identifiers are removed, to a radio terminal subordinated to the base station itself.

In the first embodiment, the removal request includes information indicating a reason for removing the predetermined identifiers from the first information.

A wireless LAN access point according to the first embodiment comprises: a transmitter configured to transmit a removal request for removing an identifier of the wireless LAN access point itself from first information, to a base station configured to transmit the first information to a radio terminal controlled by the base station itself, the first information including an identifier indicating a wireless LAN access point that is a candidate of a standby target or a connection target when a radio terminal switches the standby target or the connection target from a mobile communication network to a wireless LAN.

A base station according to a second embodiment is a base station configured to constitute a mobile communication network. The base station comprises: a receiver configured to receive a request for a connection determination transmitted from a wireless LAN access point in response to a connection request from a radio terminal to the wireless LAN access point; and a transmitter configured to transmit a response to the request for the connection determination, to the wireless LAN access point. The response to the request for the connection determination includes information indicating a connection refusal reason when the base station refuses the connection, by the radio terminal, to the wireless LAN access point.

In the second embodiment, the request for the connection determination includes at least any one of: information on a throughput of the wireless LAN access point; information on a load of the wireless LAN access point; and information on a transmission stop time of the wireless LAN access point.

In the second embodiment, the connection refusal reason indicates that a cause thereof is at least any one of: load balancing; the wireless LAN access point planning to stop a transmission; a handover procedure of the radio terminal being executed; and a throughput of the wireless LAN access point being not sufficient.

In the second embodiment, the transmitter transmits, to the wireless LAN access point, either one of information designating a radio terminal for which the request for the connection determination is necessary, or information designating a time period in which the request for the connection determination is necessary.

A wireless LAN access point according to the second embodiment is a wireless LAN access point configured to constitute a wireless LAN. The wireless LAN access point comprises: a receiver configured to receive a connection request from a radio terminal; and a transmitter configured to transmit a response to the connection request to the radio terminal when refusing the connection request, the response including information indicating a refusal reason. The refusal reason is based on a connection refusal reason received from a base station configured to manage a cell in which the radio terminal exists.

The wireless LAN access point according to the second embodiment further comprises: a controller configured to control, when receiving the connection request, to request, to the base station, a connection determination to the wireless LAN access point. The connection refusal reason from the base station is included in a response to the request for the connection determination.

In the second embodiment, the refusal reason indicates that a cause thereof is at least any one of: load balancing; a handover procedure of the radio terminal being executed; and the wireless LAN access point planning to stop a transmission; and a throughput of the wireless LAN access point being not sufficient.

In the second embodiment, the refusal reason is identical to the connection refusal reason received from the base station.

First Embodiment (Communication System)

A communication system according to a first embodiment will be described, below. FIG. 1 is a diagram showing a communication system 1 according to the first embodiment.

As shown in FIG. 1, the communication system 1 includes a radio base station 100 and an access point 200. Further, the communication system 1 includes a radio terminal 10 capable of connecting to the radio base station 100 or the access point 200.

The radio terminal 10 is a terminal such as a cell phone or a tablet computer. The radio terminal 10 has a function of performing radio communication with the access point 200, in addition to a function of performing radio communication with the radio base station 100.

The radio base station 100 has a first coverage area 100A, and in the first coverage area 100A, provides a mobile communication service represented by LTE (Long Term Evolution). The radio base station 100 manages one or a plurality of cells, and the first coverage area 100A is configured by one or a plurality of cells. The radio base station 100 is an entity of a mobile communication network. It is noted that a cell may be thought of as a term to indicate a geographical area, and may also be thought of as a function of performing radio communication with the radio terminal 10.

The access point 200 has a second coverage area 200A, and in the second coverage area 200A, provides a wireless LAN service. The access point 200 is an entity of a wireless LAN. At least a part of the second coverage area 200A overlaps the first coverage area 100A. A whole of the second coverage area 200A may overlap the first coverage area 100A. Generally, the second coverage area 200A is smaller than the first coverage area 100A.

(Application Scene)

In the first embodiment, a method of performing, by the radio terminal, the switching process (for example, a network selection and a traffic steering) of switching a standby target or a connection target between a mobile communication network and a wireless LAN, will be described. The radio terminal 10 in an RRC connected state or an RRC idle state performs a switching process in order to select a network in which data (packet) is exchanged, out of a mobile communication network (cellular communication network) and a wireless LAN (WLAN communication network). Specifically, when a state is continued over a predetermined period where first information at a mobile communication network side satisfies a first condition and second information at a wireless LAN side satisfies a second condition, the switching process (for example, a network selection and a traffic steering) is executed.

In the first embodiment, the switching process includes both of: a process of switching a standby target or a connection target from a mobile communication network to a wireless LAN, and a process of switching a standby target or a connection target from the wireless LAN to the mobile communication network.

Here, the first information at the mobile communication network side is a measurement result (RSRPmeas) of a signal level of a received signal (RSRP: Reference Signal Received Power) and a measurement result (RSRQmeas) of a signal quality of a received signal (RSRQ: Reference Signal Received Quality), for example.

The second information at the wireless LAN side is a channel utilization value of a wireless LAN (ChannelUtilizationWLAN), a backhaul value of a downlink of a wireless LAN (BackhaulRateDlWLAN), a backhaul value of an uplink of a wireless LAN (BackhaulRateUlWLAN), and a signal level of a received signal (RSSI: Received Signal Strength Indicator), for example.

(Switching Process from Mobile Communication Network to Wireless LAN)

A first condition that the standby target or the connection target is switched from the mobile communication network to the wireless LAN is that either one of the following condition (1a) or (1b) is satisfied, for example. It is noted that the first condition may be that all of the following conditions (1a) to (1b) are satisfied.

(1a) RSRPmeas<$\text{Thresh}_{ServingOffloadWLAN, LowP}$ (1b) RSRQmeas<$\text{Thresh}_{ServingOffloadWLAN, LowQ}$ It is noted that "$\text{Thresh}_{ServingOffloadWLAN, LowP}$" and "$\text{Thresh}_{ServingOffloadWLAN, LowQ}$" are threshold values provided from the radio base station 100 or previously determined threshold values.

A second condition that the standby target or the connection target is switched from the mobile communication network to the wireless LAN is that all of the following conditions (1c) to (1f) are satisfied, for example. It is noted that the second condition may be that any one of the following conditions (1c) to (1f) is satisfied.

(1c) ChannelUtilizationWLAN<$\text{Thresh}_{ChUtilWLAN, Low}$ (1d) BackhaulRateD1WLAN>$\text{Thresh}_{BackhRateDLWLAN, High}$ (1e) BackhaulRateU1WLAN>$\text{Thresh}_{BackhRateULWLAN, High}$ (1f) RSSI>$\text{Thresh}_{BEACONSRSSI, HIGH}$ It is noted that "$\text{Thresh}_{ChUtilWLAN, Low}$", "$\text{Thresh}_{BackhRateDLWLAN, High}$", "$\text{Thresh}_{BackhRateULWLAN, High}$", and "$\text{Thresh}_{BEACONSRSSI, High}$" are threshold values provided from the base station 100 or previously determined threshold values.

(Switching Process from Wireless LAN to Mobile Communication Network)

A first condition that the standby target or the connection target is switched from the wireless LAN to the mobile communication network is that the following conditions (2a) and (2b) are satisfied, for example. It is noted that the first condition may be that either one of the following condition (2a) or (2b) is satisfied.

(2a) RSRPmeas>$\text{Thresh}_{ServingOffloadWLAN, HighP}$ (2b) RSRQmeas>$\text{Thresh}_{ServingOffloadWLAN, HighQ}$ It is noted that "$\text{Thresh}_{ServingOffloadWLAN, HighP}$" and "$\text{Thresh}_{ServingOffloadWLAN, HighQ}$" are threshold values provided from the base station 100 or previously determined threshold values.

A second condition that the standby target or the connection target is switched from the wireless LAN to the mobile communication network is that any one of the following conditions (2c) to (2f) is satisfied, for example. It is noted that the second condition may be that all of the following conditions (2c) to (2f) are satisfied.

(2c) ChannelUtilizationWLAN>$\text{Thresh}_{ChUtilWLAN, High}$ (2d) BackhaulRateD1WLAN<$\text{Thresh}_{BackhRateDLWLAN, Low}$ (2e) BackhaulRateU1WLAN<$\text{Thresh}_{BackhRateULWLAN, Low}$ (2f) RSSI<$\text{Thresh}_{BEACONSRSSI, Low}$ It is noted that "$\text{Thresh}_{ChUtilWLAN, High}$", "$\text{Thresh}_{BackhRateDLWLAN, Low}$", "$\text{Thresh}_{BackhRateULWLAN, Low}$", and "$\text{Thresh}_{BEACONSRSSI, Low}$" are threshold values provided from the base station 100 or previously determined threshold values.

It is noted that when the above-described threshold values are not provided, the radio terminal 10 may omit to acquire (that is, receive or measure) information in which the threshold values are not provided.

In the first embodiment, the above-described various types of threshold values are examples of a determination parameter (for example, a RAN assistance parameter) for determining whether or not to perform the switching process of switching the standby target or the connection target between the mobile communication network and the wireless LAN. That is, the determination parameter includes one or more values selected from among "$\text{Thresh}_{ServingOffloadWLAN, LowP}$", "$\text{Thresh}_{ServingOffloadWLAN, LowQ}$", "$\text{Thresh}_{ChUtilWLAN, Low}$", "$\text{Thresh}_{BackhRateDLWLAN, High}$", "$\text{Thresh}_{BackhRateULWLAN, High}$", "$\text{Thresh}_{BEACONSRSSI, High}$", "$\text{Thresh}_{ServingOffloadWLAN, HighP}$", "Thresh$_{ServingOffloadWLAN, HighQ}$", "Thresh$_{ChUtilWLAN, High}$", "Thresh$_{BackhRateDLWLAN, Low}$", "Thresh$_{BackhRateULWLAN, Low}$", and "Thresh$_{BEACONSRSSI, Low}$".

Further, the determination parameter may include a predetermined period (TsteeringWLAN) during which a state in which the radio terminal satisfies the first condition or the second condition should be continued. Alternatively, when an offload process of switching, by the radio terminal, the standby target or the connection target from the mobile communication network to the wireless LAN is performed, the determination parameter may include a below-described predetermined period (T350 timer value) that the radio terminal 10 should hold.

The determination parameter includes an individual parameter individually notified from the radio base station 100 to the radio terminal 10 and a broadcast parameter broadcast from the radio base station 100 to the radio terminal 10. The individual parameter is included in an RRC message (for example, RRC Connection Reconfiguration) transmitted from the radio base station 100 to the radio terminal 10, for example. The broadcast parameter is included in an SIB (for example, WLAN-OffloadConfig-r12) broadcast from the radio base station 100, for example. It should be noted that when receiving the individual parameter in addition to the broadcast parameter, the radio terminal 10 preferentially applies the individual parameter over the broadcast parameter.

(Radio Terminal)

Figure 2:
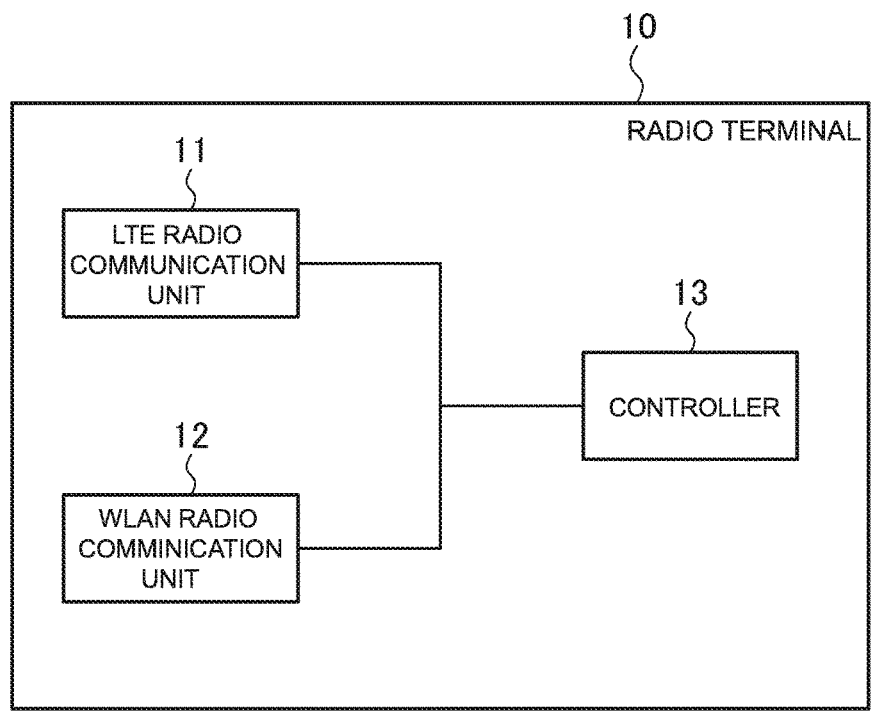
FIG. 2 is a block diagram showing a radio terminal 10 according to each embodiment.

A radio terminal according to the first embodiment will be described, below. FIG. 2 is a block diagram showing the radio terminal 10 according to the first embodiment.

As shown in FIG. 2, the radio terminal 10 includes an LTE radio communication unit (transmitter/receiver) 11, a WLAN radio communication unit (transmitter/receiver) 12, and a controller 13.

The LTE radio communication unit 11 has a function of performing radio communication with the radio base station 100, and is configured by a radio transceiver, for example. For example, the LTE radio communication unit 11 regularly receives a reference signal from the radio base station 100. The LTE radio communication unit 11 regularly measures a signal level of a reference signal (RSRP) and a signal quality of a reference signal (RSRQ). The LTE radio communication unit 11 receives, as the determination parameter, the individual parameter and the broadcast parameter from the radio base station 100.

The WLAN radio communication unit 12 has a function of performing radio communication with the access point 200, and is configured by a radio transceiver, for example. For example, the WLAN radio communication unit 12 receives a beacon or probe response from the access point 200. The beacon or probe response includes a BBS Load information element, the channel utilization value of the wireless LAN (ChannelUtilizationWLAN) may be acquired from the BBS Load information element.

The WLAN radio communication unit 12 receives a response (GAS Response) returned from the access point 200 in response to a request (GAS (Generic Advertisement Service) Request) for the access point 200. The response (GAS Response) includes a backhaul value of a downlink of a wireless LAN (BackhaulRateD1WLAN) and a backhaul value of an uplink of a wireless LAN (BackhaulRateU1WLAN). Such an inquiry procedure is performed in accordance with ANQP (Access Network Query Protocol) defined in Hotspot2.0 of WFA (Wi-Fi Alliance).

The WLAN radio communication unit 12 receives a signal from the access point 200. The WLAN radio communication unit 12 measures a signal level of the received signal (RSSI). The signal level of the received signal (RSSI) is a signal intensity of the beacon or probe response.

The controller 13 is configured by a CPU (processor), a memory, and the like, and controls the radio terminal 10. Specifically, the controller 13 controls the LTE radio communication unit 11 and the WLAN radio communication unit 12. Further, when a state is continued over a predetermined period where the first information at the mobile communication network side satisfies the first condition and the second information at the wireless LAN side satisfies the second condition, the controller 13 executes a switching process of switching the standby target or the connection target between the mobile communication network and the wireless LAN.

When executing an onload process (or a re-offload process) of switching the standby target or the connection target from the wireless LAN to the mobile communication network after performing an offload process of switching the standby target or the connection target from the mobile communication network to the wireless LAN, the controller 13 discards the individual parameter.

In particular, as a principle, the controller 13 is configured to hold the individual parameter, in a period (T350 timer value) during which the predetermined timer (the above-described (T350 timer)) activated by the radio terminal 10 during transition to an idle state along with the offload process is activated. In other words, the controller 13 is configured to discard the individual parameter when the predetermined timer expires or the predetermined timer stops.

(Radio Base Station)

Figure 3:
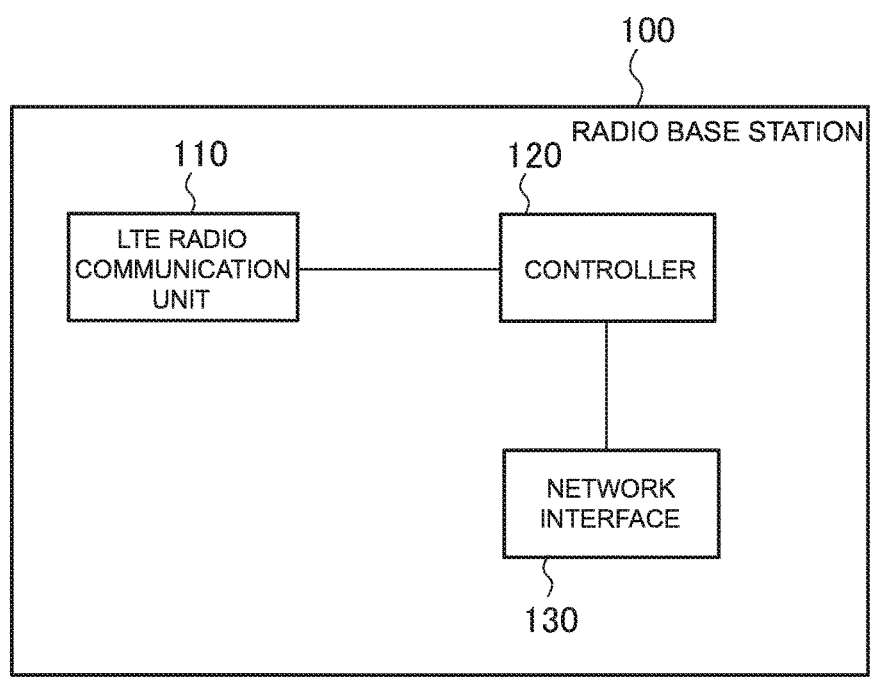
FIG. 3 is a block diagram showing a radio base station 100 according to each embodiment.

The radio base station according to the first embodiment will be described, below. FIG. 3 is a block diagram showing the radio base station 100 according to the first embodiment.

As shown in FIG. 3, the radio base station 100 includes an LTE radio communication unit (transmitter/receiver) 110, a controller 120, and a network interface (transmitter/receiver) 130.

The LTE radio communication unit 110 has a function of performing radio communication with the radio terminal 10. For example, the LTE radio communication unit 110 regularly transmits a reference signal to the radio terminal 10. The LTE radio communication unit 110 is configured by a radio transceiver, for example. The LTE radio communication unit 110 transmits, as the determination parameter, the individual parameter and the broadcast parameter to the radio terminal 10. As described above, the LTE radio communication unit 110 notifies the radio terminal 10, by an RRC message (for example, RRC Connection Reconfiguration), of the individual parameter, and notifies the radio terminal 10, by an SIB (for example, WLAN-OffloadConfig-r12), of the broadcast parameter.

The controller 120 is configured by a CPU (processor), a memory, and the like, and controls the radio base station 100. Specifically, the controller 120 controls the LTE radio communication unit 110 and the network interface 130. It is noted that a memory configuring the controller 120 may function as a storage unit, and in addition to the memory configuring the controller 120, a memory configuring the storage unit may be arranged.

The network interface 130 is connected to a neighboring base station via the X2 interface and is connected to an MME/S-GW via an S1 interface. The network interface 130 is used in communication performed on the X2 interface and communication performed on the S1 interface. Further, the network interface 130 may be connected via a predetermined interface to the access point 200. The network interface 130 is used for communication with the access point 200.

(Access Point)

Figure 4:
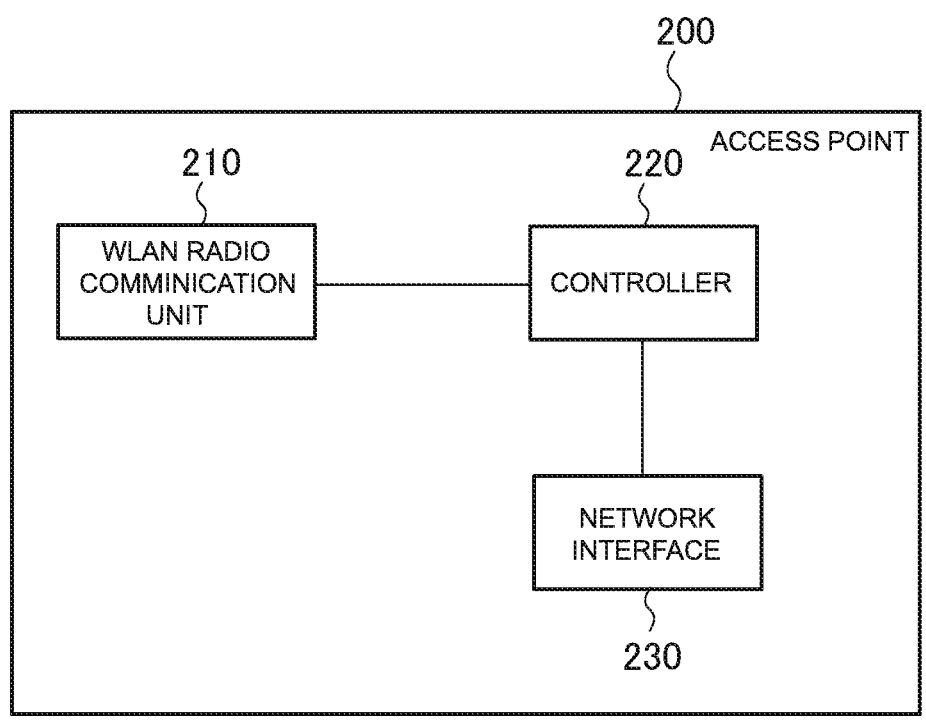
FIG. 4 is a block diagram showing an access point 200 according to each embodiment.

The access point according to the first embodiment will be described, below. FIG. 4 is a block diagram showing the access point 200 according to the first embodiment.

As shown in FIG. 4, the access point 200 includes a WLAN radio communication unit (transmitter/receiver) 210, a controller 220, and a network interface (transmitter/receiver) 230.

The WLAN radio communication unit 210 has a function of performing radio communication with the radio terminal 10, and has a similar function to the WLAN radio communication unit 12 of the radio terminal 10. It is noted that the WLAN radio communication unit 210 receives a connection request from the radio terminal 10. Further, the WLAN radio communication unit 210 transmits a response to the connection request, to the radio terminal 10.

The controller 220 is configured by a CPU (processor), a memory, and the like, and controls the access point 200. Specifically, the controller 220 controls the WLAN radio communication unit 210 and the network interface 230. It is noted that a memory configuring the controller 220 may function as a storage unit, and in addition to the memory configuring the controller 220, a memory configuring the storage unit may be arranged.

The network interface 230 is connected, via a predetermined interface, to a backhaul. The network interface 230 is used for communication with the radio base station 100. Further, the network interface 230 may be directly connected via a predetermined interface to the radio base station 100.

(Determination of Switching Process)

Determination of the switching process will be described by using a process of switching from the mobile communication network to the wireless LAN, for example, below.

Firstly, a method of determining whether or not a state where the first information satisfies the first condition is continued over a predetermined period (TsteeringWLAN) will be described. The first information is a measurement result (RSRPmeas) of a signal level (RSRP) of a reference signal or a measurement result (RSRQmeas) of a signal quality (RSRQ) of a reference signal, the reference signal is received regularly in a short cycle, and the RSRPmeas or the RSRQmeas is measured in a relatively short cycle. That is, the RSRPmeas or the RSRQmeas is acquired continuously in a time-axis direction.

Secondly, a method of determining whether or not a state where the second information satisfies the second condition is continued over a predetermined period (TsteeringWLAN) will be described. There is no fixed rule about a cycle in which the second information is acquired. That is, the second information (for example, BackhaulRateD1WLAN or BackhaulRateU1WLAN) is acquired discretely in a time-axis direction.

Operation According to First Embodiment

Figure 5:
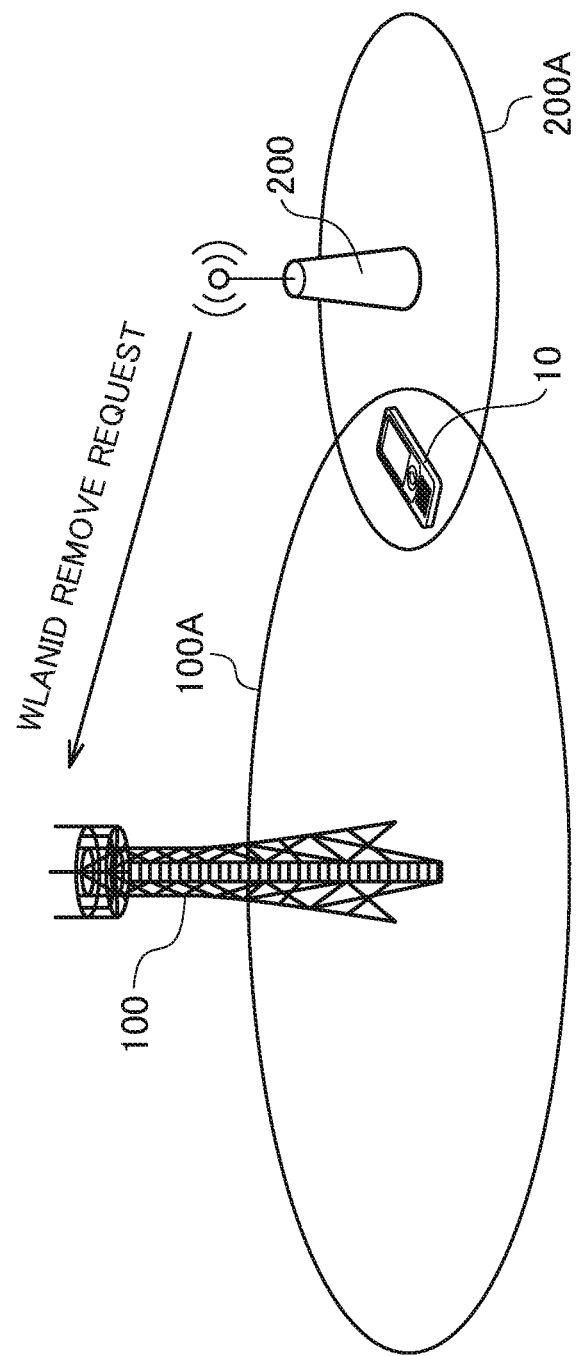
FIG. 5 is an explanatory diagram for describing an operation according to a first embodiment.

Next, an operation according to the first embodiment will be described by using FIG. 5. FIG. 5 is a diagram for describing an operation according to the first embodiment. FIG. 5 is a similar operation environment to FIG. 1.

The radio terminal 10 exists in the first coverage area 100A. "Existing" means that the radio terminal 10 is in a standby state (RRC idle state) in a cell managed by the radio base station 100, or in a connected state (RRC connected state) where the radio terminal 10 is connected to a cell managed by the radio base station 100. The radio terminal 10 is in a standby state or in a connected state, in the mobile communication network.

The radio base station 100 transmits a list of identifiers (hereinafter, "WLANID list") indicating the access point 200 that acts as a candidate of the standby target or the connection target in the wireless LAN, to the radio terminal 10. The radio base station 100 transmits, by an SIB, the WLANID list to the radio terminal 10. The radio terminal 10 autonomously determines, on the basis of a radio signal and a determination parameter from the access point 200 indicated by an identifier within the WLANID list, whether to perform the switching process. The radio terminal 10 transmits, to the access point 200, a connection request (Association request), when determining to perform the switching process from the mobile communication network to the wireless LAN (see FIG. 6).

The access point 200 transmits a response (Association response) to the connection request, to the radio terminal 10, when receiving the connection request from the radio terminal 10. The access point 200 transmits, to the radio terminal 10, the response to the connection request including either information indicating an approval of the connection request or information indicating a refusal of the connection request.

The first embodiment is a case where the switching process to the wireless LAN of the radio terminal 10 is not wished by the access point 200. For example, when a load of the access point 200 is large, the access point 200 does not wish the connection (request) of the radio terminal 10. Further, when a processing load is large, the access point 200 may not wish the connection (request) of the radio terminal 10. The access point 200 may not wish the connection of the radio terminal 10 when planning to stop the transmission within a predetermined time (when the power source is turned off within a predetermined time, for example). Further, the access point 200 may not wish the connection of the radio terminal 10 when a throughput of the access point 200 is not sufficient (when not possible to provide a sufficient throughput to the radio terminal 10). Further, the access point 200 may not wish the connection of the radio terminal 10 when the number of radio terminals connected to the access point 200 exceeds a threshold value.

As shown in FIG. 5, when not wishing the connection of the radio terminal 10, the access point 200 transmits, to the radio base station 100, a removal request (WLANID REMOVE REQUEST). The access point 200 transmits the removal request, via a direct interface or backhaul with the radio base station 100, to the radio base station 100.

The removal request is a request to remove an identifier of at least one or more access points 200 from the WLANID list held by the radio base station 100. The removal request includes an identifier of a predetermined access point 200 that should be removed from the WLANID list. The identifier of the predetermined access point 200 includes a BSSID, and an SSID, for example. The removal request may include a network identifier (ESSID) in the wireless LAN.

The removal request may include information indicating a reason (Cause) to remove an identifier of the access point 200 from the WLANID list. The removal reason includes at least one of the following reasons (causes), for example.

Load of the access point 200 is large (Over load)

Processing load of the access point 200 is large (Over processing load)

The access point 200 stops transmission within a predetermined time period (Turn off plan)

The throughput of the access point 200 is not sufficient (Not available sufficient throughput)

When the removal reason is the "Over load" or the "Over processing load", the removal request may include information on the load of the access point 200. The information on the load of the access point 200 is information indicating the magnitude of the load, for example. Specifically, the information indicating the magnitude of the load may be either one of High, Middle, or Low, and may be an integer value. Further, when the removal reason is the "Over load", the information indicating the magnitude of the load may be the same index as a Compsite available capacity IE.

When the removal reason is the "Turn off plan", the removal request may include information on a transmission stop time of the access point 200. Specifically, the information on the transmission stop time is information indicating a transmission stop time or a timer showing the predetermined time period. It is noted that when the access point 200 stops the transmission, the access point 200 may stop the transmission by stopping the WLAN radio communication unit 210, or may stop the transmission as a result of the power source of the access point 200 being turned off.

When the removal reason indicates the "No available sufficient throughput", information on the throughput of the access point 200 may be included. The information on the throughput may be information indicating a currently measured throughput, or may be information indicating a throughput predicted to be achievable.

When receiving the removal request, the radio base station 100 may remove, in response to the removal request, the identifier of the access point 200 from the WLANID list. Alternatively, the radio base station 100 may determine whether or not to remove the identifier of the access point 200 from the WLANID list. The radio base station 100 determines, on the basis of the removal reason included in the removal request, for example, whether or not to remove the identifier of the access point 200. For example, when the information indicating the magnitude of the load is lower than a threshold value, the radio base station 100 determines to not remove the identifier of the access point 200. The threshold value may be a threshold value variable in accordance with the load of the radio base station 100. Alternatively, when the throughput of the access point 200 is higher than the threshold value, the radio base station 100 determines to not remove the identifier of the access point 200. The threshold value may be a threshold value variable in accordance with the QoS of the radio terminal 10 within a cell of the radio base station 100.

The radio base station 100 may transmit a response to the removal request, to the access point 200. When refusing the removal request, that is, when not removing the identifier of the access point 200, the radio base station 100 may transmit the response to the access point 200. As a result, the access point 200 is capable of knowing from the WLANID list that the identifier of the access point 200 is not removed.

It is noted that the access point 200 may know from the WLANID list whether or not the identifier of the access point 200 is removed, on the basis of the WLANID list, from the radio base station 100, included in the SIB.

The radio base station 100 is capable of transmitting, by the SIB, the WLANID list (that is, an updated WLANID list) in which the identifier of the access point 200 is removed, to the radio terminal 10 within the cell of the radio base station 100. The radio base station 100 may transmit the updated WLANID list to the radio terminal 10 within the cell of the radio base station 100, triggered by the removal of the identifier of the access point 200 from the WLANID list.

It is noted that the access point 200 in which the identifier of the access point 200 is removed from the WLANID list may transmit, to the radio base station 100, an addition request to add the identifier of the access point 200 to the WLANID list, when the cause in which the radio terminal 10 does not wish the connection is resolved (when there is no removal reason described above). The radio base station 100 adds, in response to the addition request, the identifier of the access point 200 to the WLANID list. Alternatively, when a predetermined time passes since removing the identifier of the access point 200, the radio base station 100 may add the removed identifier of the access point 200 to the WLANID list. It is noted that information (a timer, a time, and the like) indicating the predetermined time may be included in the removal request sent from the access point 200.

Summary of First Embodiment

In the first embodiment, the radio base station 100 receives the removal request from the access point 200. As a result, the identifier of the access point 200 may be removed from the WLANID list transmitted from the radio base station 100 to the radio terminal 10. The radio terminal 10 does not transmit the connection request to the access point 200 removed from the WLANID list, and thus, when the access point 200 does not wish the switching process to the wireless LAN, it is possible to decrease the radio terminal from performing the connection request to the access point 200.

Second Embodiment (Operation According to Second Embodiment)

Figure 6:
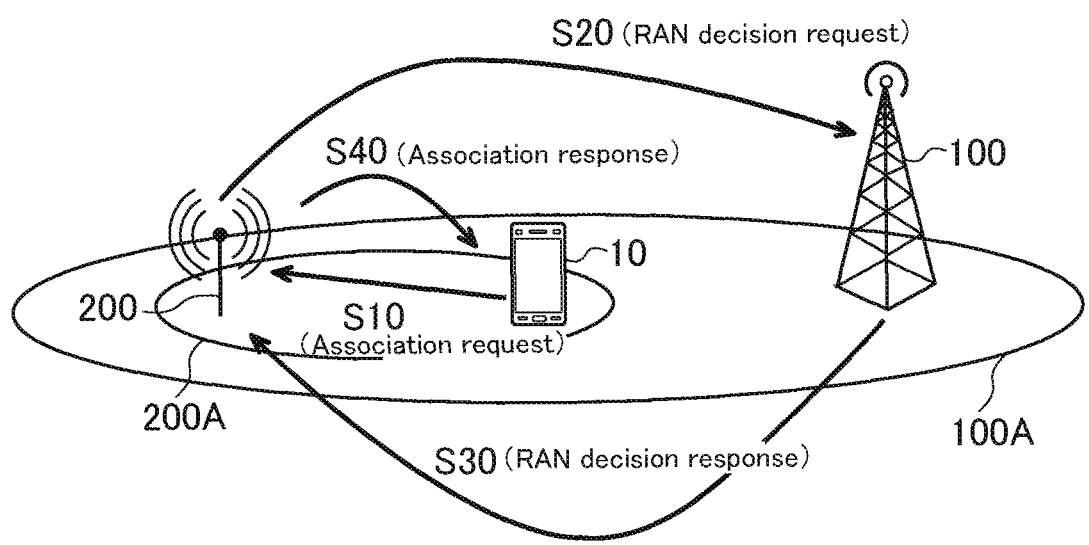
FIG. 6 is an explanatory diagram for describing an operation according to a second embodiment.

Next, an operation according to the second embodiment will be described by using FIG. 6. FIG. 6 is an explanatory diagram for describing an operation according to the second embodiment. Similar portions to the above-described first embodiment will not be described where appropriate.

The first embodiment is a case where the switching process to the wireless LAN of the radio terminal 10 is not wished by the access point 200. The second embodiment is a case where the switching process to the wireless LAN of the radio terminal 10 is not wished by the radio base station 100.

As shown in FIG. 6, within a first coverage area 100 of a cell managed by the radio base station 100, there is the access point 200. Further, the first coverage area 100A and the second coverage area 200A of the access point 200 overlap at least partially. In the present embodiment, a whole of the second coverage area 200A overlaps the first coverage area 100A.

As shown in FIG. 6, the radio terminal 10 is in the first coverage area 100A, and is in the second coverage area 200A. The radio terminal 10 is in a standby state or in a connected state, in the mobile communication network. In this case, it is assumed that the radio terminal 10 determines to perform the switching process from the mobile communication network to the wireless LAN.

In step S10, the radio terminal 10 transmits a connection request (Association request) to the access point 200 indicated by an identifier of the WLANID list.

In step S20, the access point 200 transmits a request for a connection determination (RAN decision request) in response to the connection request from the radio terminal 10, to the radio base station 100. The request for the connection determination is to request the radio base station 100 to determine whether to approve or refuse the connection by the radio terminal 10 to the access point 200.

The request for the connection determination includes the identifier (UE ID) of the radio terminal 10. The access point 200 may include, when receiving a connection request from a plurality of radio terminals 10, a list of identifiers (UE IDs) of the plurality of radio terminals 10, into the request for the connection determination.

Further, the request for the connection determination includes the identifier of the access point 200 from which the request for the connection determination is transmitted.

The request for the connection determination may include at least any one of: information on the throughput of the access point 200, information on the load of the access point 200, and information on the transmission stop time of the access point 200. These information are the same information as described in the first embodiment.

It is noted that the radio base station 100 may transmit, to the access point 200, information (the identifier of the radio terminal 10, for example) designating the radio terminal 10 that requires the request for the connection determination, and designation information designating a time period (from 08:00 to 20:00, for example) during which the request for the connection determination is required. The access point 200 transmits the request for the connection determination, on the basis of the designation information.

For example, the access point 200 transmits the request for the connection determination, when the identifier of the radio terminal 10 that transmits the connection request matches an identifier of a radio terminal 10 included in the designation information. Otherwise, the access point 200 does not transmit the request for the connection determination. Alternatively, the access point 200 transmits the request for the connection determination, when within the time period included in the designation information. Otherwise, the access point 200 does not transmit the request for the connection determination. Alternatively, the access point 200 transmits the request for the connection determination, when before the timer included in the designation information expires. The access point 200 does not transmit the request for the connection determination, when a timer included in the designation information expires. As a result, it is possible to prevent an increase in signaling based on the transmission of the request for the connection determination.

The radio base station 100 that receives the request for the connection determination determines whether to approve or refuse the connection by the radio terminal 10 to the access point 200. The radio base station 100 determines, on the basis of the information included in the request for the connection determination, for example, whether to approve or refuse the connection by the radio terminal 10 to the access point 200. For example, when the information indicating the magnitude of the load is lower than a threshold value, the radio base station 100 determines to approve the connection by the radio terminal 10 to the access point 200. The threshold value may be a threshold value variable in accordance with the load of the radio base station 100. Alternatively, when the throughput of the access point 200 is higher than the threshold value, the radio base station 100 determines to approve the connection by the radio terminal 10 to the access point 200. The threshold value may be a threshold value variable in accordance with the QoS of the radio terminal 10 within a cell of the radio base station 100.

In step S30, the radio base station 100 transmits a response to the request for the connection determination (RAN decision response) to the access point 200. The response to the request for the connection determination includes the identifier (UE ID) of the radio terminal 10 and the identifier (WLAN AP ID) of the access point 200 of the transmission target. It is noted that when the request for the connection determination includes a list of the identifiers of the plurality of radio terminals 10, the response to the request for the connection determination includes the list of identifiers of the plurality of radio terminals 10.

Further, when the radio base station 100 approves the connection by the radio terminal 10 to the access point 200, the response to the request for the connection determination indicates a connection approval (Permit). When the radio base station 100 refuses the connection by the radio terminal 10 to the access point 200, the response to the request for the connection determination indicates a connection refusal (not permit). In this case, the response to the request for the connection determination includes information indicating a connection refusal reason.

The connection refusal reason includes at least any one of the following reasons (causes), for example.

Load balancing

The access point 200 stops transmission within a predetermined time period (Turn off plan)

Handover procedure of the radio terminal 10 is being executed (Ongoing HO sequence)

The throughput of the access point 200 is not sufficient (Not available sufficient throughput)

It is noted that in the Load balancing, the load of the access point 200 may be high, and the load of the radio base station 100 may be low.

Further, in a case where the radio base station 100 controls the transmission stop time of the access point 200 (where the access point 200 does not know the transmission stop time), for example, the connection refusal reason indicates a reason that the access point 200 stops the transmission within a predetermined time period.

Further, when the handover procedure of the radio terminal 10 is being executed, the reason why the connection is refused is because it is desirable that the radio terminal 10 determines the switching process on the basis of the determination parameter of the radio base station 100 after the handover. It is noted that during a handover sequence, the radio base station 100 that acts as a source base station is capable of setting the determination parameter of the radio base station 100 that acts as a target base station to the radio terminal 10.

In step S40, the access point 200 that receives the response to the request for the connection determination transmits, to the radio terminal 10, a response (Association response) to the connection request from the radio terminal 10. The access point 200 transmits, in response to the response to the request for the connection determination, a response to the connection request indicating either the approval of the connection request or the refusal of the connection request. When the response to the connection request indicates the refusal of the connection request, the response to the connection request includes information indicating the refusal reason in a Status Code field. The refusal reason is based on a connection refusal reason included in the response to the request for the connection determination. For example, the refusal reason is identical to the connection refusal reason included in the response to the request for the connection determination.

The refusal reason included in the response to the connection request includes at least any one of the following reasons (causes), for example.

Load balancing

The access point 200 stops transmission within a predetermined time period (Ready for energy saving (or Turn off plan))

Handover procedure of the radio terminal 10 is being executed (Ongoing HO sequence)

The throughput of the access point 200 is not sufficient (Not available sufficient throughput)

The refusal reason may be the same expression as the connection refusal reason included in the response to the request for the connection determination, and may be a different reason from the connection refusal reason. Therefore, the access point 200 may change the connection refusal reason included in the response to the request for the connection determination and include the changed connection refusal reason into the response to the connection request. For example, the access point 200 may transmit, to the radio terminal 10, the response to the connection request including, as the refusal reason, the "Ready for energy saving (preparation for energy saving)", when the connection refusal reason from the radio base station 100 indicates the "Turn off plan".

The radio terminal 10 that receives the response to the connection request indicating the approval of the connection request starts the process for connecting to the access point 200.

On the other hand, the radio terminal 10 that receives the response to the connection request indicating the refusal of the connection request is capable of performing an operation according to the refusal reason, for example. For example, when the Load balancing is the refusal reason, the radio terminal 10 is capable of stopping transmitting the connection request. When the access point 200 stopping the transmission within a predetermined time period and the throughput of the access point 200 being not sufficient are the refusal reason, the radio terminal 10 is capable of transmitting a connection request to another access point 200. W the handover procedure of the radio terminal 10 is being executed, the radio terminal 10 is capable of determining, after the handover procedure is ended, the switching process on the basis of the determination parameter of the target base station.

Summary of Second Embodiment

In the second embodiment, the radio base station 100 receives the request for the connection determination transmitted from the access point 200 in response to the connection request, sent from the radio terminal 10, to the access point 200. The radio base station 100 transmits the response to the request for the connection determination, to the access point 200. The access point 200 transmits the response to the connection request, to the radio terminal 10. When refusing the connection by the radio terminal 10 to the access point 200, the radio base station 100 includes the information indicating the connection refusal reason, into the response to the request for the connection determination. The response to the connection request includes the information indicating the refusal reason based on the connection refusal reason received from the radio base station 100. As a result, the access point 200 is capable of including the reason that the radio base station 100 refuses the connection, into the response to the connection request. Thus, even when the switching process to the wireless LAN is not wished by the radio base station 100, the radio terminal 10 is capable of knowing the connection refusal reason of the radio base station 100. As a result, the radio terminal 10 is capable of determining whether to transmit the connection request on the basis of the refusal reason, and thus, it is possible to reduce an unnecessary connection request.

Other Embodiments

The contents of the present application are described through each of the above-described embodiments, but it should not be understood that the discussion and the drawings constituting a part of this disclosure limit to the contents of the present application. From this disclosure, various alternative embodiments, examples, and operational technologies will become apparent to those skilled in the art.

In each of the above-described embodiments, the access point 200 exchanges the above-described signaling with the radio base station 100; however, this is not limiting. For example, an access controller (AC) configured to control the access point(s) 200 may transmit and receive the above-described signaling with the radio base station 100. For example, in the first embodiment, the AC, instead of the plurality of access points 200, may transmit the removal request to the radio base station 100. In this case, the removal request may include a list of identifiers of the access points 200 (an BSS ID list, and an EDD ID list, for example). Further, in the second embodiment, the request for the connection determination may be transmitted, via the AC, to the radio base station 100. Further, the response to the request for the connection determination may be transmitted, via the AC, to the access point 200.

In the above-described first embodiment, the access point 200 may transmit the removal request to the radio base station 100, without using, as the trigger, the connection request from the radio terminal 10. For example, when the access point 200 does not desire the switching process, by the radio terminal 10, from the mobile communication network to the wireless LAN (when the load of the access point 200 already exceeds the threshold value, for example), the removal request may be transmitted to the radio base station 100. The access point 200 may transmit, by using, as the trigger, the determination that the switching process is not desired, the removal request to the radio base station 100.

In the above-described second embodiment, the response to the connection request includes the connection refusal reason of the radio base station 100; however, when the access point 200 does not receive the connection refusal reason from the radio base station 100 (when the access point 200 independently makes the determination without requesting the connection determination to the radio base station 100, for example), the response to the connection request may include the connection refusal reason in the access point 200.

In the above-described second embodiment, within the first coverage area 100 of the cell managed by the radio base station 100, there is the access point 200; however, this is not limiting. When the first coverage area 100A and the second coverage area 200A overlap partially, the radio terminal 10, the radio base station 100, and the access point 200 may perform the operation according to the second embodiment.

In the above-described second embodiment, the radio base station 100 may previously transmit, before receiving the request for the connection determination, the information indicating the connection refusal to the access point 200. For example, when knowing the transmission stop time of the access point 200, the radio base station 100 is capable of preventing an increase in signaling by previously transmitting the information indicating the connection refusal to the access point 200.

In the above-described second embodiment, the radio base station 100 may exclude (delete), when refusing the connection by the radio terminal 10 to the access point 200 (that is, the response to the request for the connection determination includes information indicating a connection refusal reason), the identifier of the access point 200 from the WLANID list. In this case, the radio base station 100 may transmit, by the SIB, the WLANID list in which the identifier of the access point 200 is removed, to the radio terminal 10 within a cell of the radio base station 100 (see first embodiment).

Although not particularly mentioned in the embodiments, a program may be provided to cause a computer to execute each process performed by any one of the radio terminal 10, the radio base station 100, and the access point 200. Further, the program may be recorded on a computer-readable medium. By using the computer-readable medium, it is possible to install the program in a computer. Here, the computer-readable medium recording the program thereon may include a non-transitory recording medium. The non-transitory recording medium is not particularly limited; the non-transitory recording medium may include a recording medium such as a CD-ROM or a DVD-ROM, for example.

Alternatively, a chip may be provided which is configured by: a memory that stores therein a program for executing each process performed by any one of the radio terminal 10, the radio base station 100, and the access point 200; and a processor for executing the program stored in the memory.

In each embodiment, the LTE is exemplified as the mobile communication network. However, the embodiment is not limited thereto. It may suffice when the mobile communication network is a network provided by a communication carrier. Therefore, the mobile communication network may be a UMTS (Universal Mobile Telecommunication System) or may be GSM (registered trademark).

The invention claimed is:

1. A base station, comprising:
a controller including a memory, wherein
the controller is configured to store a list in the memory, the list including at least one identifier of a Wireless Local Area Network (WLAN) access point,
the controller is further configured to execute a process of receiving first information from a node configured to connect to the at least one WLAN access point, and
the first information includes at least one identifier of a WLAN access point to be deleted from the list,
the controller is further configured to update the list on a basis of the first information,
the controller is configured to execute a process of sending, to the node, a response to the first information if the controller refuses updating based on the first information, and
the response indicates that the base station refuses updating based on the first information.

2. The base station according to claim 1, wherein the controller is configured to execute a process of transmitting a list based on the updated list.

3. The base station according to claim 1, wherein the controller is configured to execute a process of sending a response to the received first information, to the node.

4. The base station according to claim 1, wherein the controller is configured to execute a process of receiving second information, and
the second information includes at least one identifier of a WLAN access point to be added to the list.

5. An apparatus for a base station, comprising:
a processor and a memory, the processor configured to cause the base station to:
store a list in the memory, the list including at least one identifier of a Wireless Local Area Network (WLAN) access point, and
receive first information from a node configured to connect to the at least one WLAN access point, wherein
the first information includes at least one identifier of a WLAN access point to be deleted from the list,
the processor is further configured to cause the base station to update the list on a basis of the first information,
the processor is further configured to cause the base station to send, to the node, a response to the first information if the processor refuses updating based on the first information, and
the response indicates that the base station refuses updating based on the first information.

* * * * *